(12) United States Patent
Rovik et al.

(10) Patent No.: US 10,074,092 B2
(45) Date of Patent: Sep. 11, 2018

(54) SYSTEMS AND METHODS FOR PROVIDING IN-VEHICLE COMMUNICATION WITH A VENDOR

(75) Inventors: Christopher Lee Rovik, Canton, MI (US); Charan S. Lota, Canton, MI (US); Donald Anthony Restauri, III, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1198 days.

(21) Appl. No.: 13/409,775

(22) Filed: Mar. 1, 2012

(65) Prior Publication Data

US 2013/0232029 A1 Sep. 5, 2013

(51) Int. Cl.
*G06Q 30/00* (2012.01)
*G07C 5/00* (2006.01)
*G07C 5/08* (2006.01)

(52) U.S. Cl.
CPC ........... *G06Q 30/016* (2013.01); *G07C 5/008* (2013.01); *G07C 5/0841* (2013.01)

(58) Field of Classification Search
CPC .......................................... G06Q 30/06–30/08
USPC ............................................... 705/26.1–27.2
See application file for complete search history.

(56) References Cited

U.S. PATENT DOCUMENTS

| | | |
|---|---|---|
| 6,708,086 B2 | 3/2004 | Richard |
| 6,880,750 B2 | 4/2005 | Pentel |
| 7,343,174 B2 | 3/2008 | Suryanarayana et al. |
| 7,359,868 B2 | 4/2008 | Kirkpatrick |
| 7,620,026 B2 | 11/2009 | Anschutz et al. |
| 7,628,325 B2 | 12/2009 | McIntosh |
| 7,752,075 B2 | 7/2010 | Angert et al. |
| 2002/0143655 A1 | 10/2002 | Elston et al. |
| 2006/0221918 A1 | 10/2006 | Wang |
| 2008/0313046 A1 | 12/2008 | Denenburg et al. |
| 2010/0088181 A1 | 4/2010 | Crolley et al. |
| 2010/0156712 A1* | 6/2010 | Pisz et al. ................ 342/357.09 |
| 2010/0280956 A1* | 11/2010 | Chutorash et al. ............. 705/64 |

* cited by examiner

*Primary Examiner* — Ethan D Civan
(74) *Attorney, Agent, or Firm* — Dinsmore & Shohl LLP

(57) ABSTRACT

A vehicle may communicate with a vendor interaction system of a vendor. The vehicle includes network interface hardware, a processor communicatively coupled to the network interface hardware, and at least one display communicatively coupled to the at least one processor. The processor executes logic to establish a communication link with the vendor interaction system, receive, with the network interface hardware, a vendor data signal from the vendor interaction system, the vendor data signal indicative of vendor information, receive, with the network interface hardware, a user preference data signal indicative of user order preferences for the vendor, display at least one of the user order preferences and the vendor information on the at least one display, and display an order prompt requesting a user to make an order selection from at least one of the vendor information or the user order preferences displayed on the at least one display.

21 Claims, 3 Drawing Sheets

SYSTEMS AND METHODS FOR PROVIDING IN-VEHICLE COMMUNICATION WITH A VENDOR

TECHNICAL FIELD

Embodiments provided herein generally relate to a vehicle, and more specifically to a vehicle for communicating with a vendor interaction system.

BACKGROUND

Products and services of a vendor are often ordered by a customer while seated in the interior of their vehicle. For example, many fast food restaurants and the like maintain pick up windows and ordering interfaces such as menu boards that enable audible communication between a customer and a vendor employee. The customer must communicate with a vendor ordering interface that is outside of the customer's vehicle, meaning the customer must, for example, roll down their window and expose themselves to outside conditions. Exposing the customer in a vehicle to outside conditions, such as weather conditions, can be non ideal. Additionally, communication between a customer inside of their vehicle with a vendor ordering interface outside of the vehicle can be strained through outside background noise. An order can be misinterpreted or misunderstood, and confusion between the customer and vendor may result in an incorrect fulfillment of an order. Additionally, the customer is only offered menu options and other information that is available on the vendor ordering interface, and the menu options are not personalized for a specific customer.

Accordingly, a need exists for a vehicle that can communicate with a vendor interaction system to send and/or receive information relevant to a customer order.

SUMMARY

In one embodiment, a vehicle may communicate with a vendor interaction system of a vendor. The vehicle may comprise network interface hardware, at least one processor communicatively coupled to the network interface hardware, and at least one display communicatively coupled to the at least one processor. The at least one processor may execute logic to establish a communication link with the vendor interaction system; receive, with the network interface hardware, a vendor data signal from the vendor interaction system, the vendor data signal indicative of vendor information; receive, with the network interface hardware, a user preference data signal indicative of user order preferences for the vendor; display at least one of the user order preferences and the vendor information on the at least one display; and display an order prompt on the at least one display requesting a user to make an order selection from at least one of the vendor information or the user order preferences displayed on the at least one display.

In another embodiment, a method for a vehicle to communicate with a vendor interaction system may comprise establishing a communication link with the vendor interaction system; receiving, with network interface hardware of the vehicle, a vendor data signal from the vendor interaction system, the vendor data signal indicative of vendor information; receiving, with the network interface hardware of the vehicle, a user preference data signal indicative of user order preferences for a vendor; displaying at least one of the user order preferences and the vendor information on at least one display of the vehicle; and displaying an order prompt on the at least one display requesting a user to make an order selection from at least one of the vendor information or the user order preferences displayed on the at least one display.

These and additional features provided by the embodiments described herein will be more fully understood in view of the following detailed description, in conjunction with the drawings

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
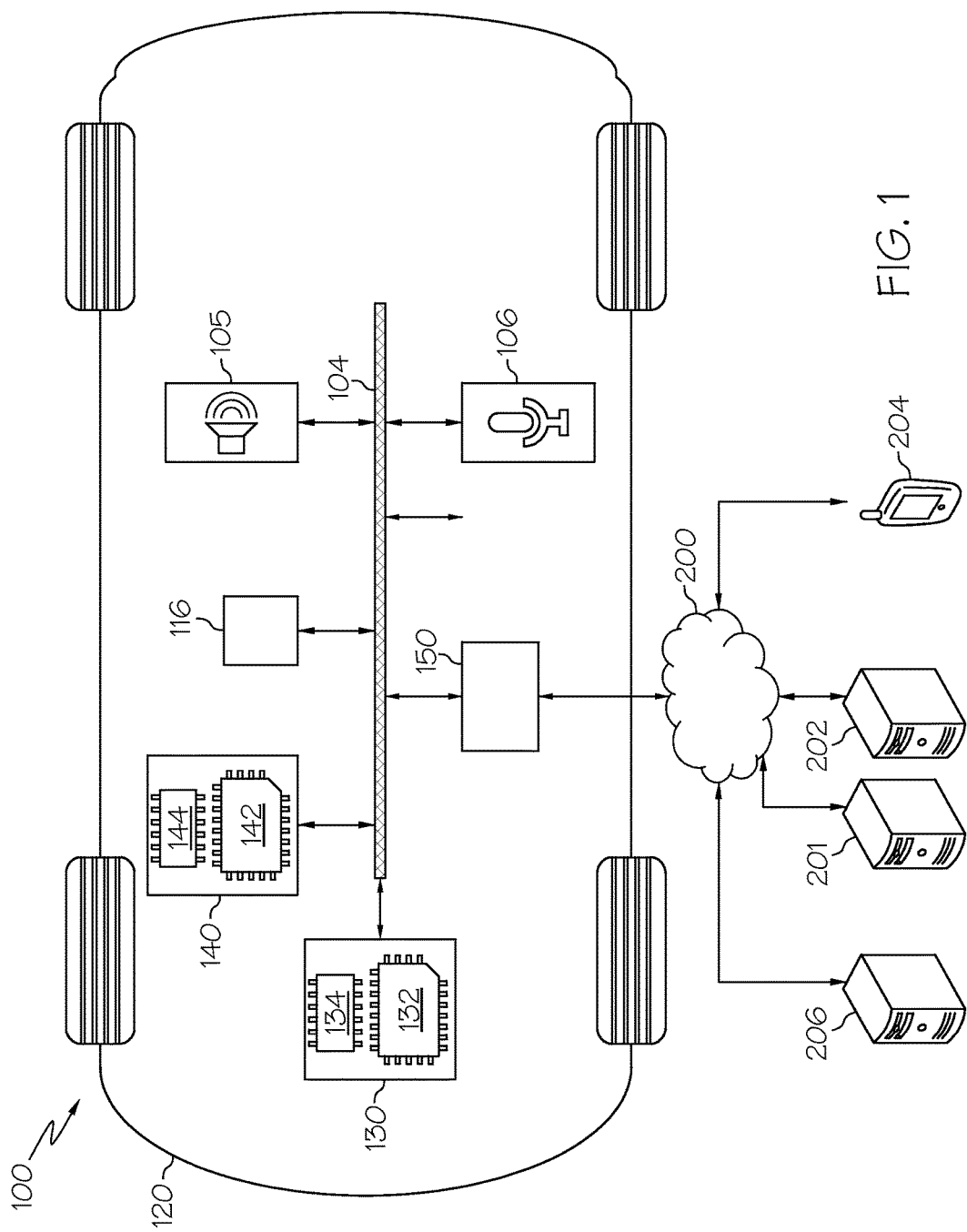
FIG. 1 schematically depicts a networked system comprising a vehicle and a vendor interaction system according to one or more embodiments shown and described herein.

FIG. 1 generally shows a vehicle for communicating with other networked components, including a vendor interaction system of a vendor. The vehicle may comprise network interface hardware, a processor, and a display. The vehicle can establish a communication link with the vendor interaction system, and optionally with the other networked devices. The vehicle can receive information such as vendor information and user order preferences, and may display such information on a display in the vehicle. The vehicle may additionally prompt a user to make an order selection from the vendor and transmit the order selection to the vendor interaction system. The vehicle may receive invoice information from the vendor interaction system and may display a payment prompt for the user, allowing the user to select a payment method. The vehicles for communicating with a vendor interaction system and methods will be described in more detail herein with specific reference to the drawings.

Referring now to FIG. 1, an embodiment of a networked system 100 comprising a vehicle 102 and a vendor interaction system 201 is schematically depicted. It is noted that, while the vehicle 102 is depicted as an automobile, the vehicle 102 may be any passenger or non-passenger vehicle such as, for example, a terrestrial, aquatic, and/or airborne vehicle. The vehicle 102 may comprise a communication path 104 that provides data interconnectivity between various vehicle modules disposed within the vehicle 102. Accordingly, the communication path 104 communicatively couples any number of vehicle modules with one another, and allows the vehicle modules to operate in a distributed computing environment. Specifically, each of the vehicle modules can operate as a node that may send and/or receive data. In one embodiment, the communication path 104 can comprise a conductive material that permits the transmission of electrical data signals to processors, memories, sensors, and actuators throughout the vehicle 102. In another embodiment, the communication path 104 can be a vehicle bus, such as for example a LIN bus, a CAN bus, a VAN bus, and the like. In further embodiments, the communication path 104 may be wireless or, alternatively, an optical waveguide. As used herein, the term "communicatively coupled" means that the components are capable of exchanging data signals with one another such as, for example, electrical signals via conductive medium, electromagnetic signals via air, optical signals via optical waveguides, and the like.

The vehicle 102 generally comprises input/output hardware communicatively coupled with the communication path 104. The input/output hardware serves as an interconnection between a driver and the vehicle 102. The input/output hardware can be any device capable of transforming mechanical, optical, or electrical signals into a data signal capable of being transmitted with the communication path 104. Moreover, the input/output hardware can be any device capable of transforming a data signal into a mechanical, optical, or electrical output. Each individual component of the input/output hardware can optionally include one or more processors and one or more memories. Alternatively, each individual component of the input/output hardware can optionally omit a processor and/or a memory. Accordingly, it is noted that, while specific components are described herein as including a processor and/or a memory, the embodiments described herein should not be so limited.

In one embodiment, the input/output hardware can include a tactile input device 116 such as, for example, a button, a switch, a knob, or the like. The physical motion of the tactile input device 116 can be digitized into a data signal that can be transmitted to a vehicle component. The input/output hardware can further include a microphone 106 for receiving input from a user. The microphone 106 can be any sensor that transforms mechanical vibrations into a data signal. The term "sensor," as used herein, means a device that measures a physical quantity and converts it into a data signal, which is correlated to the measured value of the physical quantity, such as, for example, an electrical signal, an electromagnetic signal, an optical signal, a mechanical signal, or the like.

The input/output hardware may also include a speaker 105 for transforming data signals into mechanical vibrations. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Figure 2:
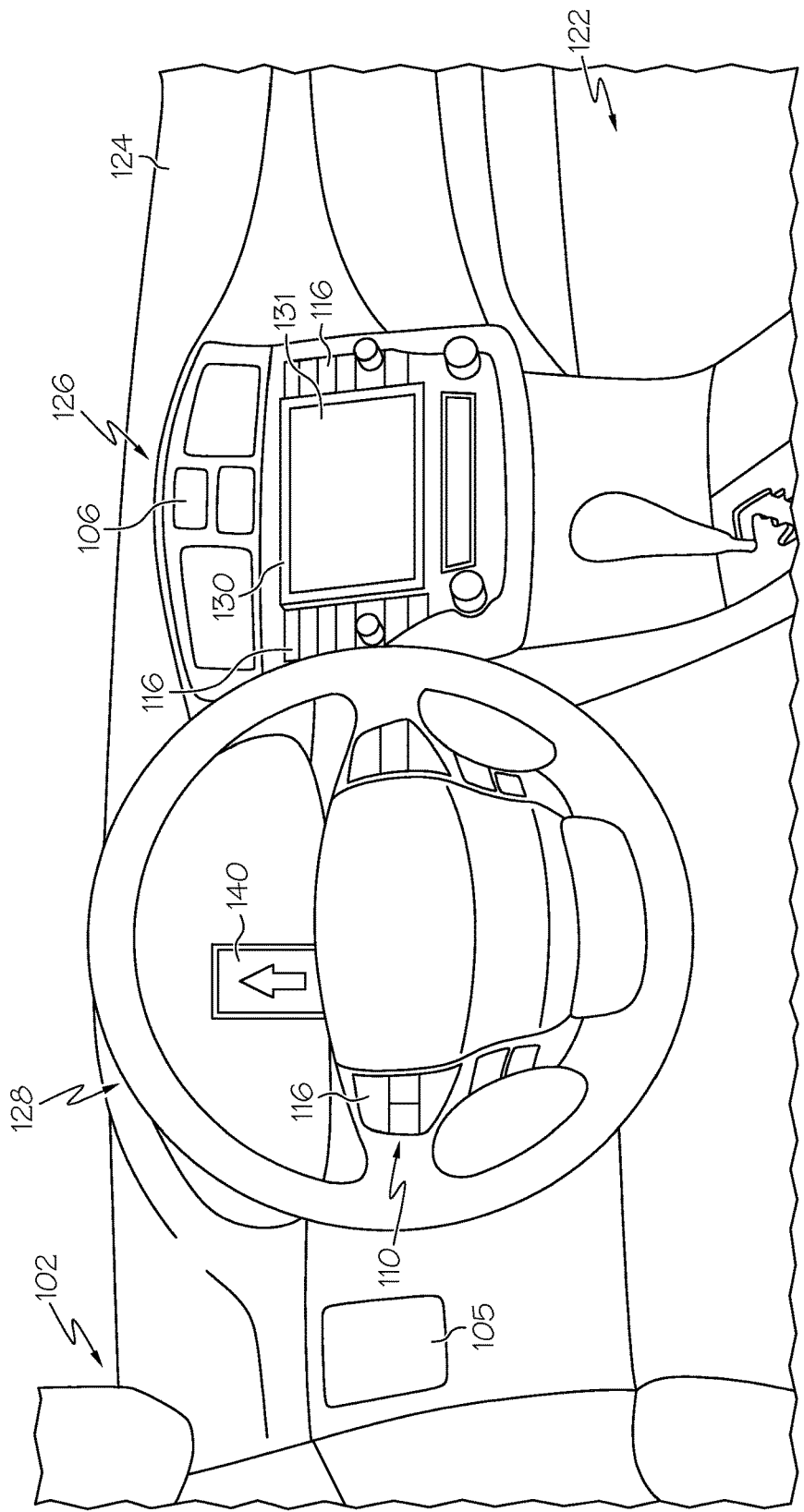
FIG. 2 schematically depicts the passenger compartment of the vehicle according to one or more embodiments shown and described herein.

Referring to FIGS. 1 and 2, the input/output hardware can include one or more displays 130,140 for visually presenting data. The one or more displays 130,140 can be located throughout the passenger compartment 122 of the vehicle 102 and can include any medium capable of transmitting an optical output such as, for example, a cathode ray tube, light emitting diodes, liquid crystal displays, plasma displays, or the like. Each of the one or more displays 130,140 can be a touchscreen that, in addition to providing optical information, detects the presence and location of a tactile input upon a surface of or adjacent to the display 130,140. Accordingly, each display 130,140 can receive mechanical input directly upon the optical output provided by the display 130,140.

In one embodiment, the vehicle 102 may include an audio head unit display 130 communicatively coupled with the communication path 104. The audio head unit display 130 can comprise an audio processor 132 communicatively coupled to an audio memory 134. The vehicle 102 may further include an instrument cluster display 140 communicatively coupled with the communication path 104. The instrument cluster display 140 can comprise a cluster processor 142 communicatively coupled with a cluster memory 144. Additionally, it is noted that, while each of the audio head unit display 130 and the instrument cluster display 140 are depicted in FIG. 1 as including an integral processor 132 and memory 134, each of the audio head unit display 130 and the instrument cluster display 140 may be implemented without a processor and/or a memory. For example, any of the processors described herein may be separately located within any component communicatively coupled with the communication path 104. Accordingly, the vehicle 102 may include a plurality of components each having one or more processors that are communicatively coupled with one or more of the other components. Thus, the embodiments described herein may utilize a distributed computing arrangement to perform any portion of the logic described herein.

According to the embodiments described herein, a processor means any device capable of executing machine readable instructions. Accordingly, each processor may be a controller, an integrated circuit, a microchip, a computer, or any other computing device. The memory described herein may be RAM, ROM, a flash memory, a hard drive, or any device capable of storing machine readable instructions.

Embodiments of the present disclosure comprise logic that includes machine readable instructions or an algorithm written in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the logic or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, or as a combination of hardware and software components.

Moreover, the logic can be distributed over various components that are communicatively coupled over a network 200 that may include one or more cellular networks, satellite networks and/or computer networks such as, for example, a wide area network, a local area network, personal area network, a global positioning system and combinations thereof. Accordingly, the vehicle 102 can be communicatively coupled to the network 200 via wires, via a wide area network, via a local area network, via a personal area network, via a cellular network, via a satellite network and the like. Suitable local area networks may include wired ethernet and/or wireless technologies such as, for example, Wi-Fi. Suitable personal area networks may include wireless technologies such as, for example, IrDA, Bluetooth, Wireless USB, Z-Wave, ZigBee, and the like. Alternatively or additionally, suitable personal area networks may include wired computer buses such as, for example, USB and FireWire. Suitable cellular networks include, but are not limited to, technologies such as LTE, WiMAX, UMTS, CDMA, and GSM. Thus, any components of the vehicle 102 can utilize one or more network components to transmit signals over the Internet or World Wide Web.

In one embodiment, the vehicle 102 comprises network interface hardware 150 for communicatively coupling the vehicle 102 with the network 200. The network interface hardware 150 can be communicatively coupled to the communication path 104 and can be any device capable of transmitting and/or receiving data via the network 200. Accordingly, the network interface hardware 150 can include an antenna and/or other communication transceiver for sending and/or receiving any wired or wireless communication. For example, the network interface hardware 150 may include an antenna, a modem, LAN port, wireless fidelity (Wi-Fi) card, WiMax card, mobile communications hardware, near-field communication hardware, satellite communication hardware, global positing system interaction hardware, and/or any wired or wireless hardware for communicating with other networks and/or devices.

The network 200 can communicatively couple the vehicle 102 to other devices in a flexible client-server relationship, i.e., the vehicle 102 can be a server to and/or a client of any device communicatively coupled to the vehicle 102 via the network 200. Specifically, the network 200 can be configured to enable the delivery of cloud resources to and/or from the vehicle 102. Any device communicatively coupled to the vehicle 102 can deliver a cloud resource to the vehicle 102 via the network 200. Similarly, the vehicle 102 can deliver a cloud resource via the network 200 to any device communicatively coupled to the vehicle 102. Accordingly, cloud resources such as, for example, processing, storage, software, and information can be shared via the network 200.

Still referring to FIG. 1, a networked system 100 comprising a vehicle 102 is depicted. The network 200 may be utilized to communicatively couple a vehicle 102, one or more remote computing devices 202, one or more mobile devices 204, one or more vendor interaction systems 201, and one or more home computing devices 206. Accordingly, each of the vehicle 102, one or more remote computing devices 202, the one or more mobile devices 204, one or more vendor interaction systems 201, and the one or more home computing devices 206 can be communicatively coupled to one another directly or indirectly via the network 200. For example, one or more devices communicatively coupled to the network 200 can operate as an intermediary to transmit data between any of the other devices. Accordingly, the network 200 can facilitate a distributed computing arrangement amongst the vehicle 102, the one or more remote computing devices 202, the one or more mobile devices 204, the one or more vendor interaction systems 201, and the one or more home computing devices 206. Specifically, any of the devices communicatively coupled to the network 200 can share cloud resources such that each communicatively coupled device can perform any portion of the logic described herein.

As is noted above, the vehicle 102 can be communicatively coupled to the one or more remote computing devices 202 via the network 200. Each of the one or more remote computing devices 202 can comprise one or more processors and one or more memories. The one or more processors can execute logic to provide cloud resources to the vehicle 102 and/or any other device communicatively coupled to the network 200. For example, the one or more remote computing devices 202 can provide supplementary processing power, via relatively high powered processors, to the vehicle 102. Additionally, the one or more remote computing devices 202 can provide supplementary data storage to the vehicle 102. Moreover, the one or more remote computing devices 202 can provide platforms such as, for example, a social networking service, news service, weather service, traffic service, map service (e.g., restaurant data, fuel station data, service station data), and any other service capable of being exchanged between a server and a client. In one embodiment a remote computing device 202 may be a server.

The networked system 100 may comprise one or more vendor interaction systems 201 communicatively coupled to the vehicle 102 via the network 200. The vendor interaction system 201 may comprise a vendor computing device. Each of the one or more vendor computing devices can comprise one or more processors and one or more memories. The one or more processors can execute logic to provide cloud resources and/or data to the vehicle 102 and/or any other device communicatively coupled to the network 200. For example, the one or more vendor computing devices can provide supplementary processing power, via relatively high powered processors, to the vehicle 102. Additionally, the one or more vendor computing devices can provide supplementary data storage to the vehicle 102. The vendor interaction system 201 may be physically located at a vendor's geographic location and may be operated locally by the vendor. A vendor, as used herein, may be any person, persons, business entity, and the like, who sell or distribute goods or provide services. For example, vendors may include, but are not limited to, fast food restaurants, carry-out restaurants, pharmacies, grocery stores, dry cleaners, and drive-through convenience stores. The embodiments described herein may be particularly beneficial for a vendor with a pick up window.

The networked system 100 may further comprise one or more home computing devices 206 communicatively coupled to the vehicle 102 via the network 200. Each of the one or more home computing devices 206 can comprise one or more processors and one or more memories. Accordingly, the one or more home computing devices 206 can operate as a client and/or a server with respect to the vehicle 102. A home computing device 206 may be any personal computer such as a PC, laptop, tablet computer, or the like. The home computing device 206 may be capable of establishing a communication link with the vehicle 102 via a local area network (e.g., a Wi-Fi network or the like) while the vehicle 102 is in close proximity to the home computing device 206, for example when the vehicle 102 is parked near the user's home.

Still referring to FIG. 1, the networked system 100 may further comprise one or more mobile devices 204 communicatively coupled to the vehicle 102 via the network 200 or, alternatively, via near-field communications such as, for example, a Bluetooth connection or the like. Each of the one or more mobile devices 204 can comprise one or more processors and one or more memories. Accordingly, the one or more mobile devices 204 can operate as a client and/or a server with respect to the vehicle 102.

Referring again to FIG. 2, an embodiment of a vehicle 102 is depicted. The vehicle 102 may generally comprise a passenger compartment 122 with a steering wheel 110 and an instrument panel 124. The instrument panel 124 has a driver-side portion 128 and a central portion 126. A speaker 105 and a microphone 106 may be positioned in the passenger compartment 122. Additionally, the passenger compartment 122 may have a tactile input device 116, such as, for example, a button, a switch, a knob, or the like as described above. In one embodiment, the passenger compartment 122 may include an audio head unit display 130. The passenger compartment 122 may further include an instrument cluster display 140. Each of the one or more displays 130,140 may be a touchscreen 131. In one embodiment, the audio head unit display 130 has a touchscreen 131. In some embodiments, the tactile input device 116 may be operatively coupled to the audio head unit display 130, the instrument cluster display 140, or both.

Figure 3:
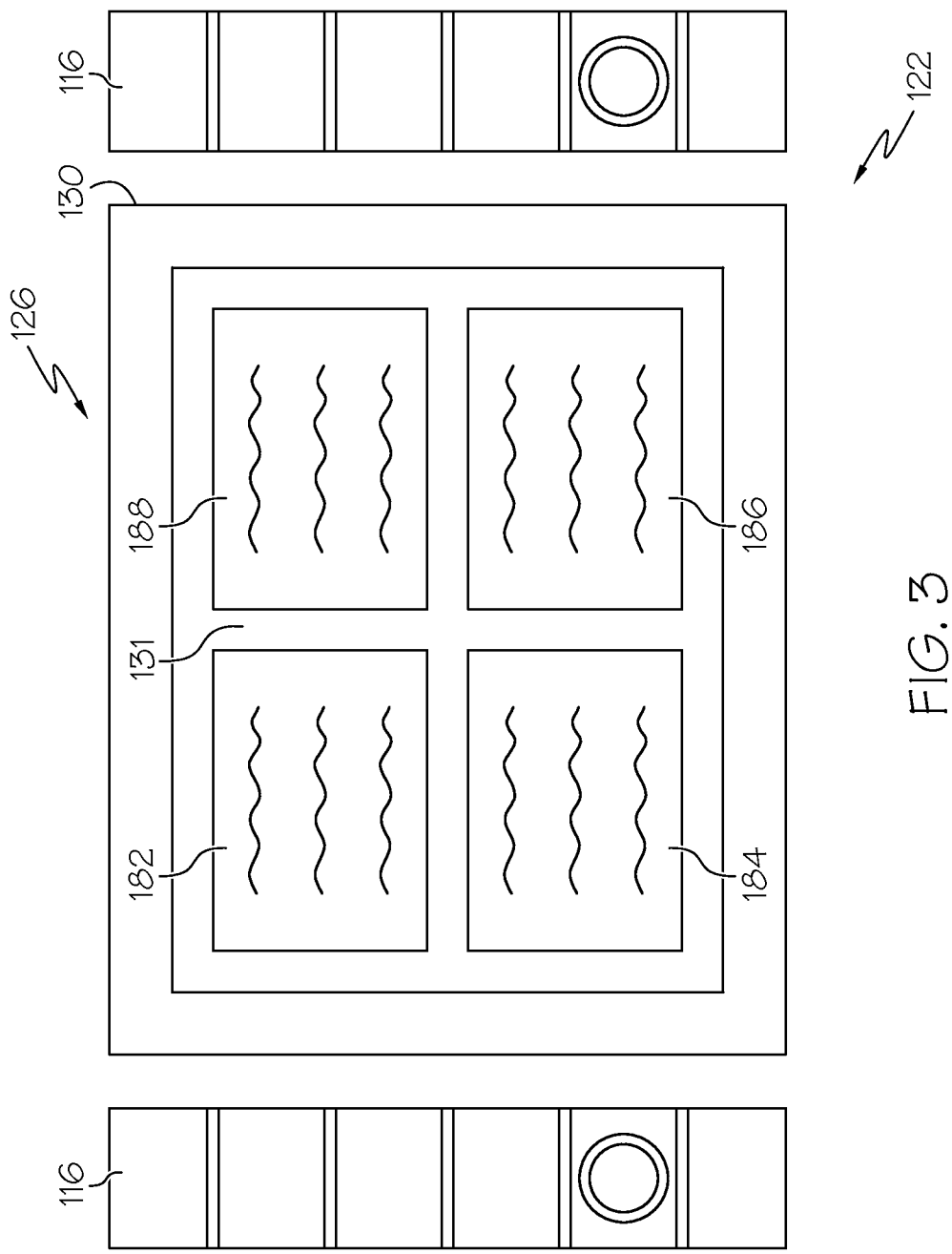
FIG. 3 schematically depicts a display unit of a vehicle according to one or more embodiments shown and described herein.

Referring now to FIG. 3, an embodiment of the audio head unit display 130 located at the central portion 126 of the instrument panel 124 in the passenger compartment 122 is shown. In this embodiment, the audio head unit display 130 comprises a touchscreen 131. In addition, tactile input devices 116 may be disposed around the audio head unit display 130. As will be described in further detail herein, the audio head unit display 130 graphically presents one or more sets of data or information on the screen areas 182, 184, 186, 188, received through the network 200 (FIG. 1) including, but not limited to, vendor information, user order preferences, coupon information, and the cost of the order.

The functionality of the networked system 100 will now be illustrated through numerous examples and embodiments. While these examples and embodiments relate to the operation of the various network components and communications exchanged therebetween, it should be understood that these examples and embodiments in no way limit the operability of the system.

The systems and methods described herein related to the intercommunication between the vehicle 102 and a vendor interaction system 201 to facilitate the display of order information, and more particularly, user preferences, on a display 130 of a vehicle 102. In the embodiments described herein, a user may create a user account that is identified with a specific user who drives or is a passenger in a vehicle 102. The user account may store various information about the user, such as identifying information of the user, user order preferences, and user payment account information. Identifying information of the user may include the user's name and other identifying features of the user. User order preferences and user payment account information will be further discussed herein, but includes information such as, but not limited to, past user order information, user selected favorites, and user payment account information such as credit or debit account information. The user account information may be transferred to the vehicle 102 and/or stored on any of the networked devices, including the vendor interaction system 201, home computing device 206, mobile device 204, or remote computing device 202. In one embodiment the user account may be stored on the remote computing device 202, such as a server, and be accessed and edited through any of the other devices by the user, such as in a cloud computing or distributed network configuration.

Referring to FIG. 1, as a vehicle 102 approaches a vendor location such as a drive through window or the like, the vehicle 102 communicates with the vendor interaction system 201 of the vendor to establish a communication link. Specifically, the processor 132 of the vehicle 102 executes logic to establish a communication link with the vendor interaction system 201 using the network interface hardware 150. The communication link may be over a local area network or a personal area network, or combinations thereof, such as a Wi-Fi network or a Bluetooth network. Alternatively, the communication link to the vendor interaction system 201 may be over a wide area network, such as a cellular network.

In one embodiment, the communication link from the vehicle 102 to the vendor interaction system 201 may be facilitated by a mobile device 204. Specifically, the processor 132 of the vehicle 102 may execute logic to establish a communication link with the mobile device 204, and the mobile device 204 may establish a communication link to the vendor interaction system 201. For example, a communication link between the vehicle 102 utilizing network interface hardware 150 and the mobile device 204 may be a over a local area network or a personal area network, or combinations thereof, such as to a Wi-Fi network or a Bluetooth network, and the communication link between the mobile device 204 and the vendor interaction system 201 may be over a wide area network, such as a cellular network. Alternatively, the communication link between the vendor interaction system 201 and the vehicle 102 may be established directly with the network interface hardware 150, such as when the communication link is a Wi-Fi network or a near field communication.

Referring to FIGS. 1-3, in one embodiment, the establishment of the communication link between the vehicle 102 and vendor interaction system 201 may be based on the geographic location of the vehicle and the geographic location of the vendor. Specifically, the processor 132 of the vehicle 102 may execute logic to identify a location of the vehicle 102 prior to establishing the communication link with the vendor interaction system 201. The vehicle 102 may identify its location through a GPS (global positioning system) signal or other means of detecting geographic location, such as through a wireless wide area network. For example, a communication link could be established between the vehicle 102 and the vendor interaction system 201 when the location of the vehicle 102 is within a certain distance of a vendor. The vendor location may be determinable from GPS information, a database of vendor geographic locations, or from a signal sent from the vendor interaction system 201.

Alternatively, the vehicle 102 may determine its geographic proximity to a vendor based on the existence of a wireless local area network or a wireless personal area network that can be detected by the network interface hardware 150 of the vehicle 120. For example, if the network interface hardware 150 of the vehicle 102 detects a local wireless network of the vendor interaction system 201, the vehicle 102 may automatically communicatively link to the vendor interaction system 201 through a local wireless network, or the user may be prompted to communicatively link to the vendor interaction system 201 through the local wireless network.

Still referring to FIGS. 1-3, the communication link between the vehicle 102 and the vendor interaction system 201 may be automatically established when the vehicle comes within a specified geographic proximity of the vendor. For example, the vehicle 102 may detect its location through a GPS signal or become aware of its proximity to the vendor through the existence of a local wireless network and automatically communicatively link with the vendor interaction system 201. Alternatively, the communication link between the vehicle 102 and the vendor interaction system 201 may not be automatic. If the link is not automatic, the user may be prompted to communicatively link the vehicle 102 with the vendor interaction system 201. Also, by identifying the vehicle 102 location, the processor 132 of the vehicle 102 may also determine the identity of vendors in close proximity, and choose whether to automatically link, display a prompt on the display 130 to link, or not to link with the vendor interaction system 201.

In one embodiment, the communication link between the vehicle 102 and the vendor interaction system 201 enables audible communication between a user inside of the vehicle 102 and the vendor interaction system 201 in addition to facilitating the exchange of data with the vendor interaction system 201. In this embodiment, the processor 132 of the vehicle 102 executes logic to establish a communication link with the vendor interaction system 201 which facilitates the exchange of audible communications between the user and the vendor interaction system 201 using the speaker 105 and the microphone 106. The user may be able to speak into the microphone 106 to send information to the vendor interaction system 201. The user may also receive information, such as audio signals, from the vendor interaction system 201 through the speaker 105. This configuration allows for the user to speak to the vendor interaction system 201 through the communication link to, for example, place an order with the vendor interaction system 201 of the vendor while remaining inside of the vehicle 102 with the doors and windows closed.

Still referring to FIGS. 1-3, once the vehicle 102 and vendor interaction system 201 have established a communication link, the vehicle 102 may utilize the network interface hardware 150 to receive a vendor data signal from the vendor interaction system 201. The vendor data signal may contain vendor information including, without limitation, at least one of a vendor identification, vendor coupons, and a menu of vendor options. The vendor identification may include the name of the vendor, a logo of a vendor or other trade names or trademarks associated with the vendor, and/or geographic information of the vendor, including global positioning coordinates or a street address of the vendor. Vendor coupons may include coupons supplied by the vendor or product specials and promotional information of a vendor. The menu of vendor options may include a menu of goods or services that are sold, scheduling information of the vendor (i.e. hours of operation and the like), or other information related to the products or services of the vendor. In one embodiment, when the vendor is a restaurant such as a fast food restaurant, a menu of vendor options may include at least one of a food menu, other ordering information, advertisements, promotional information, vouchers, tickets, and the like.

Referring now to FIGS. 2 and 3, the vehicle 102 may display the vendor information on a display 130 within the passenger compartment 122. The display 130 may visually show information in the various screen areas 182,184,186, 188 of the display 130. For example, vendor identification could be visually displayed in the first area 182, a vendor food menu could be visually displayed in the second area 184, vendor coupons could be displayed in the third area 186, and vendor promotional information could be displayed in the fourth area 188. Other combinations of vendor information could be displayed in the various screen areas 182,184,186,188, without limitation.

Referring again to FIGS. 1-3, when the vehicle 102 and vendor interaction system 201 have a communication link, the vehicle 102 may utilize the network interface hardware 150 to receive a user preference data signal from a user account stored in a networked device 201, 202, 204, 206 or alternatively stored in the vehicle memory 134. For example, in one embodiment, the user account is stored on the remote computing device 202. In this embodiment, the user account may be contained within a virtual portal maintained by the vendor, the vehicle 102 manufacturer or a third party. The user account may be communicatively linked to the vehicle 102 through the network 200 using the network interface hardware 150. The user preference data signal may contain user order preferences of the user for that vendor including, without limitation, at least one of prior orders placed with the vendor, information related to prior orders placed with the vendor, user favorite orders at that particular vendor, pending orders placed with the vendor, and coupons and discount information of the vendor including user selected coupons. The user preference data signal may also contain user order preferences of the user for a specified vendor type, such as, for example, a list of favorite food items commonly available from multiple restaurants. Specifically, the processor 132 of the vehicle 102 executes logic to utilize the network interface hardware 150 to establish a communication link with the remote computing device 202 and thereby receive the user order preference information over the network 200.

As noted herein, the vehicle 102 may receive the user preference data signal from the remote computing device 202, mobile device 204, vendor interaction system 201, or home computing device 206 over the network 200, and each such device may store the user order preferences in a memory operably associated with that device. Accordingly, while the user order preferences have been described herein as being stored on the remote computing device 202 (such as a remote server), it should be understood that in other embodiments, the user order preferences may be stored on other devices, such as the mobile device 204 and transferred to the vehicle 102 through a wired or wireless local area network or wired or wireless personal area network.

Referring to FIGS. 2-3, the vehicle 102 may display the user order preferences on a display 130 within the passenger compartment 122. The display 130 may show user order preference information in the various screen areas 182,184, 186,188. For example, prior orders placed with the vendor could be visually displayed in the first area 182, user favorite orders at the vendor could be visually displayed in the second area 184, pending orders placed with the vendor could be displayed in the third area 186, and user selected coupons could be displayed in the fourth area 188. Other combinations of user order preference information could be displayed in the various screen areas 182,184,186,188, without limitation. User order preference information as well as vendor information may be displayed on the display 130 at the same time in the various screen areas 182,184,186,188, without limitation.

In addition to the user order preferences, the vehicle 102 also displays an order prompt on the at least one display 130,140 requesting that the user make an order selection from at least one of the vendor information or the user order preferences displayed on the at least one display 130,140. The order prompt may be displayed on any of the vehicle displays 130,140, and specifically in any of the screen areas 182,184,186,188 of display 130. The order prompt may ask the user to select a menu item, or may prompt the user to select an item from their user preferences. In one embodiment, the order prompt may instruct the user to verbally communicate his or her order selection from the displayed items, such as when the microphone 106 and speaker 105 are coupled to the vendor interaction system 201. In another embodiment, the order prompt may instruct the user to select his or her order selection from the displayed items with a tactile input device 116 or by touching the display 130.

Referring to FIGS. 1-3, in one embodiment, the user may respond to the order prompt by entering their order through a tactile input, such as pressing a tactile input device 116 such as a button or a touchscreen 131 in the passenger compartment 122. The user may utilize the tactile input device 116 to make an order selection, and the order prompt may be responsive to such an order tactile input received from the user. Specifically, the processor 132 may execute logic to receive the order tactile input from the user, wherein the tactile input is representative of the user's order selection. The processor 132 then executes logic to transmit, with the network interface hardware 150, the order selection signal to the vendor interaction system 201.

In another embodiment, the order selection may be received through a user's verbal command with the microphone 106, which can be transmitted to the vendor interaction system 201. In this embodiment, the user may communicate their order to the vendor interaction system 201 through an audible command if the communication link between the vehicle 102 and vendor interaction system 201 includes the audio interaction.

When the vendor interaction system 201 receives the order selection signal, the vendor interaction system 201 determines the cost of the order. Thereafter the vendor interaction system 201 transmits an invoice signal indicative of the cost of the order to the vehicle 102 over the communication link.

The vehicle 102 then receives, with the network interface hardware 150, the invoice signal from the vendor interaction system 201. The invoice signal includes the cost of the order selection as indicated above. The cost may be a total order cost, or may be an itemized break down of the cost of each ordered item and the sales tax and other applicable fees. The cost information may be displayed on the one or more displays 130,140 of the vehicle 120, such as in any or all of the screen areas 182,184,186,188 of screen 131. The cost information may be displayed simultaneously with the vendor information and user order preferences, and may be updated in real time as a user places an order.

After the cost information is displayed, the vehicle 102 displays a payment prompt on the one or more displays 130,140 of the vehicle 102. Specifically, the processor 132 of the vehicle 102 executes logic to display a payment prompt on the at least one display 130,140 requesting the user to make a payment selection. The payment prompt may be displayed on any of the vehicle displays 130,140, and specifically in any of the screen areas 182,184,186,188 of display 130. The payment selection may include payment options for a user, such as a debit account, a credit account, a check, a gift certificate account, or cash payment. The payment account information, such as a bank account number, routing number, or credit card number, may be stored in the user account and transmits with the user order preference information. As stated herein, the information stored in the user account may be stored in and uploaded to the vehicle 102 using the network interface hardware 150 from any of the networked devices 201,202,204,206.

Referring still to FIGS. 1-3, the user may respond to the payment prompt by entering their preferred method of payment through a tactile input, such as pressing a tactile input device 116 such as a button or touchscreen 131. When the payment tactile input is received by the tactile input device 116 or touchscreen 131, the processor 132 of the vehicle 102 executes logic to receive the payment tactile input from the user and transmit that selection to the vendor interaction system 201. If a payment method associated with account information is selected by the user, the processor 132 sends the account information to the vendor interaction system 201. Alternatively, the vehicle 102 may facilitate the direct communication between the networked device 201, 202,204 in which the user account information is stored and the vendor interaction system 201 to enable direct payment from the user account. For example, the user may input the payment selection of a credit card, where upon the vehicle 102 communicatively links with the networked device holding the user account to receive the payment account information and send that payment account information to the vendor interaction system 201. Alternatively, the user may directly input their payment account information through the vehicle 102, such as through the tactile input device 116. Alternatively the payment account information could be stored in the memory 134 of the vehicle 102.

In one embodiment, when the vehicle 102 receives a payment prompt, the user may select a coupon or other discount associated with the vendor. The coupon may be received from the vendor interaction system 201 as vendor information or may be a previously selected coupon that is available to the user from their user account as user order preference information. The coupon or discount information may be displayed on the one or more displays 130,140 of the vehicle 102 and the user may select the coupon or discount using a tactile or verbal input. The coupon or discount information can be sent to the vendor interaction system 201 and applied to the cost information. The user could apply a coupon to their order either before the vehicle 102 sends payment information to the vendor interaction system 201 or prior to the user's selection of a preferred method of payment.

In one embodiment, user order preferences and vendor information can be compared with the processor 132 of the vehicle 102 and/or a processor of a networked device to create projected user order preferences. Specifically, the processor 132 of the vehicle 102, remote computing device 202, mobile device 204, vendor interaction system 201, home computing device 206, or some or all of these devices in combination, can execute logic to produce projected user order preferences based on a comparison of user order preferences and vendor information. Projected user order preferences may be determined based on other user ordering tendencies, vendor recommendations, or other marketing or other techniques for projecting future user ordering information from past ordering information.

In one embodiment, the vehicle 102 communicatively links with a networked device 201,202,204,206 to upload user order preference. The upload may send the user order preference information to a user account, which will update or replace information stored in the account. For example, after an order is made to a vendor, the vehicle 102 may upload that order information, which is now past order information, to the user account. Alternatively, the order information can be saved in the memory 134,144 of the vehicle 102 and uploaded at a later time. For example, the vehicle 102 could utilize the network interface hardware 150 to establish a communication link with the home computing device 206 over a local area network once the vehicle 102 has returned to the user's home. The order information could also be sent to a mobile device 204 to be stored in memory or uploaded to the user account at a later time.

It should now be understood that the embodiments described herein relate to vehicles and their interaction with other network devices, such as a vendor interaction system. The vehicle and methods herein enhance communication between a vendor and a customer in a vehicle, allowing for more customized ordering options and more streamlined payment methods. A customer can more quickly and accurately complete an order to a vendor and the vendor can more easily interpret and fulfill that customer's order.

While the systems and methods have been described herein with specific reference to a restaurant vendor interaction system, it should be understood that the systems and methods described herein may be used in conjunction with a variety of vendors including, but not limited to, pharmacies, grocery stores, dry cleaners, drive-through convenience stores, etc.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

We claim:

1. A vehicle for communicating with a vendor interaction system of a vendor, the vehicle comprising:
    network interface hardware;
    at least one processor communicatively coupled to the network interface hardware; and
    a GPS module communicatively coupled to the at least one processor and operable to determine the location of the vehicle;
    at least one display communicatively coupled to the at least one processor, wherein the at least one processor executes logic to:
        establish a communication link with the vendor interaction system;
        receive, with the network interface hardware, a vendor data signal from the vendor interaction system, the vendor data signal indicative of vendor information;
        receive, with the network interface hardware, a user preference data signal indicative of user order preferences for the vendor, wherein the user preference data signal contains at least one of prior orders placed with the vendor, information related to prior orders placed with the vendor, user favorite orders at the vendor, pending orders placed with the vendor, coupons of the vendor, discount information of the vendor, and a list of favorite food items commonly available from multiple vendors;
        display at least one of the user order preferences and the vendor information on the at least one display; and
        display an order prompt on the at least one audio head unit display requesting a user to make an order selection from at least one of the vendor information or the user order preferences displayed on the at least one display.

2. The vehicle of claim 1, wherein the order prompt is responsive to an order tactile input received from the user.

3. The vehicle of claim 2, wherein the at least one processor executes logic to:
    receive the order tactile input from the user indicative of the order selection;
    transmit, with the network interface hardware, an order selection signal indicative of the order selection to the vendor interaction system when the order tactile input is received from the user;
    receive, with the network interface hardware, an invoice signal from the vendor interaction system, wherein the invoice signal is indicative of a cost of the order selection; and
    display, with the at least one display, the cost of the order selection.

4. The vehicle of claim 3, wherein the at least one processor further executes logic to display a payment prompt on the at least one display requesting the user to make a payment selection, wherein the payment selection comprises at least one of a debit account, a credit account, a check, a gift certificate account, or a cash payment.

5. The vehicle of claim 4, wherein:
    the payment prompt is responsive to a payment tactile input received from the user; and
    the at least one processor further executes logic to:
        receive the payment tactile input from the user; and
        transmit an account information signal associated with the payment selection to the vendor interaction system when the payment selection indicated by the payment tactile input is one of the debit account, the credit account, or the gift certificate account.

6. The vehicle of claim 1, wherein the user preference data signal is received from the vendor interaction system.

7. The vehicle of claim 1, wherein the user preference data signal is received from a remote server.

8. The vehicle of claim 7, wherein the user preference data signal is indicative of user order preferences stored on the remote server in a user account.

9. The vehicle of claim 1, wherein the vendor information comprises at least one of a vendor identification, vendor coupons, and a menu of vendor options.

10. The vehicle of claim 1, wherein the user order preferences comprise at least one of prior orders placed with the vendor, information related to prior orders placed with the vendor, user favorite orders at the vendor, pending orders placed with the vendor, and coupon and discount information.

11. The vehicle of claim 1, wherein
    the at least one processor executes logic to identify a location of the vehicle with the GPS module prior to establishing the communication link with the vendor interaction system, and prompts the user to establish the communication link with the vendor interaction system based on the location of the vehicle.

12. The vehicle of claim 1, wherein
    prior to establishing the communication link, the at least one processor executes logic to identify a location of the vehicle with the GPS module and automatically establishes the communication link with the vendor interaction system based on the location of the vehicle.

13. The vehicle of claim 1, wherein the vehicle further comprises:
    a microphone communicatively coupled to the at least one processor; and
    a speaker communicatively coupled to the at least one processor, wherein the communication link facilitates the exchange of audible communications between the user and the vendor interaction system with the speaker and the microphone.

14. The vehicle of claim 1, wherein the user preference data signal is received from a mobile device.

15. The vehicle of claim 14, wherein the user preference data signal is indicative of user order preferences stored on the mobile device.

16. The vehicle of claim 1, wherein the at least one processor executes logic to display both the user order preferences and the vendor information on the at least one display.

17. The vehicle of claim 1, further comprising a passenger compartment comprising an instrument panel comprising an audio head unit display, a speaker, a tactile input device, and a microphone.

18. A method for a vehicle to communicate with a vendor interaction system comprising:
    determining the position of the vehicle with a GPS module;
    establishing a communication link with the vendor interaction system;
    receiving, with network interface hardware of the vehicle, a vendor data signal from the vendor interaction system, the vendor data signal indicative of vendor information;
    receiving, with the network interface hardware of the vehicle, a user preference data signal indicative of user order preferences for a vendor, wherein the user preference data signal contains at least one of prior orders placed with the vendor, information related to prior orders placed with the vendor, user favorite orders at the vendor, pending orders placed with the vendor, coupons of the vendor, discount information of the vendor, and a list of favorite food items commonly available from multiple vendors;

displaying at least one of the user order preferences and the vendor information on at least one display of the vehicle; and displaying an order prompt on the at least one display requesting a user to make an order selection from at least one of the vendor information or the user order preferences displayed on the at least one display.

19. The method of claim 18, wherein the order prompt is responsive to an order tactile input by the user and further comprising:

receiving the order tactile input from the user indicative of the order selection;

transmitting, with the network interface hardware of the vehicle, an order selection signal indicative of the order selection to the vendor interaction system when the order tactile input is indicative of the order selection is received from the user;

receiving, with the network interface hardware of the vehicle, an invoice signal from the vendor interaction system, wherein the invoice signal is indicative of a cost of the order selection; and displaying, with the at least one display, the cost of the order selection.

20. The method of claim 19, further comprising displaying a payment prompt on the at least one display requesting the user to make a payment selection, wherein the payment selection comprises at least one of a debit account, cash, or a credit account.

21. A vehicle for communicating with a vendor interaction system of a vendor, the vehicle comprising:

network interface hardware;

at least one processor communicatively coupled to the network interface hardware;

a GPS module communicatively coupled to the at least one processor and operable to determine the location of the vehicle; and at least one display communicatively coupled to the at least one processor, wherein the at least one processor executes logic to:

determine the location of the vehicle with the GPS module;

establish a communication link with the vendor interaction system through a wireless local area network or a wireless personal area network;

establish a communication link with at least one remote computing device through a wireless wide area network;

receive, with the network interface hardware, a vendor data signal from the vendor interaction system, the vendor data signal indicative of vendor information;

receive, with the network interface hardware, a user preference data signal from at least one remote computing device, the user preference data signal indicative of user order preferences for the vendor, wherein the user preference data signal contains at least one of prior orders placed with the vendor, information related to prior orders placed with the vendor, user favorite orders at the vendor, pending orders placed with the vendor, coupons of the vendor, discount information of the vendor, and a list of favorite food items commonly available from multiple vendors;

display the user order preferences and the vendor information on the at least one display;

display an order prompt on the at least one display requesting a user to make an order selection from at least one of the vendor information or the user order preferences displayed on the at least one display;

receive the order tactile input from the user indicative of the order selection;

transmit, with the network interface hardware, an order selection signal to the vendor interaction system when the order tactile input is received from the user, the order selection signal indicative of the order selection;

receive, with the network interface hardware, an invoice signal from the vendor interaction system, wherein the invoice signal is indicative of a cost of the order selection; and display, with the at least one display, the cost of the order selection.

* * * * *

UNITED STATES PATENT AND TRADEMARK OFFICE
CERTIFICATE OF CORRECTION

PATENT NO. : 10,074,092 B2
APPLICATION NO. : 13/409775
DATED : September 11, 2018
INVENTOR(S) : Christopher Lee Rovik, Charan S. Lota and Donald Anthony Restauri, III Page 1 of 1

It is certified that error appears in the above-identified patent and that said Letters Patent is hereby corrected as shown below:

In the Specification

In Column 07, Line 66, after "may be", delete "a".

Signed and Sealed this
Twelfth Day of February, 2019

Andrei Iancu
*Director of the United States Patent and Trademark Office*